Patented May 3, 1938

2,115,759

UNITED STATES PATENT OFFICE 2,115,759

MANUFACTURE OF RADIO TUBES

Francis E. Bash, Morristown, N. J., assignor to Driver-Harris Company, Harrison, N. J., a corporation of New Jersey No Drawing. Application February 3, 1937, Serial No. 123,849

7 Claims. (Cl. 250—27.5)

This invention relates to the manufacture of vacuum tubes and more particularly to the employment of a precipitation hardening alloy in the manufacture of electrode elements for vacuum tubes. By "electrode elements" I mean such parts as filaments, cathode sleeves, grids, grid wires, support wires for grids, plates or anodes, screen grids, top caps, shields or other metallic parts forming the electrode elements of a vacuum tube or parts thereof.

In the manufacture of electrode elements of vacuum tubes, certain properties are desirable in the metal during the manufacturing operations and certain additional properties are desirable in the finished tube. Thus, the metal employed must have sufficient ductility and softness to permit it to form readily into plates, caps, support wires, grids, cathodes and filaments. It should also have sufficient strength at room temperature to withstand the normal handling operations after the parts have been formed to insure the maintenance of dimensions before and after mounting.

The filaments, cathode sleeves and grids are of very fine dimensions and it is particularly desirable that they should be of high tensile strength both for the forming operation and at the temperatures encountered in the processing of the tube and in its use in finished form.

Wire used in the manufacture of grids must have high strength and toughness and preferably be capable of considerable elongation. In the manufacturing operation the grid laterals are wound continuously in a grid winding machine on a mandrel to produce the desired shape. The side supports are mounted in grooves on the surface of the mandrel and the laterals are secured to the supports by notching and peening. Workability is necessary in the material used for forming the grid laterals in order that the grid wire will closely conform to the mandrel shape in the winding operation and it is also necessary that the wire used be capable of retaining that shape after formation. The material forming the grid laterals should be stiff in order to insure maintenance of grid dimensions in the handling operations.

After the electrode elements of a vacuum tube are formed, they are usually cleaned by heating in an atmosphere of hydrogen and are then assembled on the base of the tube. The glass casing is then attached to the base over the electrode elements and sealed. During the evacuation of the tube, the glass casing is heated to drive the gases from the glass, and also the electrode elements are usually heated by passing a high frequency current through them. The heating of the electrode elements during the tube evacuation serves to dispel any gases which might be held in the elements. The electrode elements are also heated again when the tube is in use, the cathode or filament being heated directly by the current passing through the tube, and the anode and other elements being heated generally by radiated heat from the cathode. In vacuum tubes as made heretofore, the electrode elements soften during these various heating operations because of the characteristics of the materials with which they are made.

In connection with all of the metallic parts of electrode elements it is desirable that in their finished form they be as strong and stiff as possible both to withstand the handling operations and to maintain their relative positions with respect to the other parts in the tube after assembly. During handling of a tube in transportation and during use, particularly when the tube is used in a radio receiving set of an automobile, strength and stiffness are very desirable properties. If the electrode elements are not sufficiently strong and rigid to maintain their proper relative positions during use of the tube, the electrical characteristics of the tube may be altered.

It will be apparent from the foregoing that in all the electrode elements it is desirable on the one hand that the material of which they are made be relatively soft and ductile during the formation of the elements, and on the other hand that they be relatively hard and strong while in use, so that they will retain their shape and their proper relative positions. Both of these desirata are not present in electrode elements as manufactured heretofore.

The present invention is accordingly directed to the provision of an electrode element made of a material which not only possesses the desired ductility, softness and strength requisite during the formation of the element, but which also is improved in its characteristics by the various heatings during the manufacture and use of the tube, in that the heating operations increase the hardness, strength and stiffness thereof.

In accordance with my new invention, I employ a precipitation or age hardening alloy as the material from which the electrode elements are made. Precipitation or age hardening alloys are known in the art of metallurgy and are characteristic in that at least two of the metallic elements thereof are in solid solution one in the other at a critical temperature, generally a high temperature. In processing the alloy, the two metallic elements are heated to the critical temperature and caused to dissolve in each other, and the mass is then quenched, the two elements remaining in intersolution. The alloy thus treated has the characteristic that when it is heated to a temperature somewhat below the critical temperature, one of the metallic elements precipitates out of the other and causes the alloy to harden and acquire greater strength. I have found that an alloy of this characteristic can be used to great advantage in the manufacture of vacuum tubes, particularly the electrode elements thereof. While any precipitation hardening alloy may be employed, I have found that alloys of this type in which the base metal is one in the nickel-iron-cobalt series give very satisfactory results. I prefer to employ a precipitation hardening alloy having a nickel base. Such an alloy, for example, may consist principally of nickel with the usual impurities present, carbon .20 to .35 per cent, titanium .15 to .35 percent, preferably .25 percent, and magnesium .15 to .35 percent, preferably .25 percent. A precipitation hardening alloy of this composition when subjected to heat results in a material having high tensile properties and stiffness. Prior to heat treatment, that is, before it is heated to a temperature somewhat below the critical temperature, such alloy may have a tensile strength of 90,000 to 100,000 pounds per square inch with an elongation in 10 inches of 25 percent, whereas after the heat treatment the alloy may have a tensile strength of 150,000 to 170,000 pounds per square inch with relatively great rigidity.

Other elements may be substituted for the titanium and magnesium in the particular nickel base alloy disclosed, provided such other elements produce an alloy that can be hardened by precipitation. Similarly the proportions of titanium and magnesium may be varied, the alloy however remaining one consisting substantially of nickel. Additions of other elements to the alloy of nickel, titanium and magnesium which result in a precipitation hardening alloy may also be employed.

In practicing the invention, the electrode elements or parts thereof, such as filaments, grids and the like, are formed in the usual manner heretofore employed and fired in hydrogen to clean them. By reason of the relative softness and ductility of the precipitation hardening alloy at room or other working temperature, the electrode elements may be readily formed in a few simple operations and will retain their shapes. The electrode elements may then have suitable coatings applied thereto, after which they are assembled in the tube in the usual manner and subjected to the usual heating during evacuation. It will be apparent that as a result of the hydrogen firing and the heating during evacuation of the tube, the electrode elements will become stronger and more rigid than they were in their previous state, and accordingly will be better adapted to retain their proper relative positions even when the tube is jarred. Also, the heat to which the tube is subjected during use tends to increase the hardness of the electrode elements.

The term "electrode element" employed in the claims is intended to include any of the metallic elements of a vacuum tube, such as a filament, grid, grid wire, plate or the like.

I claim:

1. An electrode element for a vacuum tube comprising a precipitation hardening alloy having a base metal of the iron-nickel-cobalt series.

2. An electrode element for a vacuum tube comprising a precipitation hardening nickel base alloy.

3. An electrode element for a vacuum tube comprising a precipitation hardening alloy consisting of .15 to .35 percent titanium, .15 to .35 percent magnesium, .20 to .35 percent carbon, balance nickel.

4. An electrode element for a vacuum tube comprising a precipitation hardening alloy consisting of substantially .25 percent titanium, substantially .25 percent magnesium, substantially .30 percent carbon, balance nickel.

5. The process of making a vacuum tube which comprises forming an electrode element of a precipitation hardening alloy of the iron, nickel, cobalt series, mounting said element in a tube, and submitting the assembled tube to a temperature equal to its critical temperature during evacuation whereby the element is hardened.

6. The process of making a vacuum tube which comprises forming an electrode element of a precipitation hardening alloy consisting of .15 to .35 percent titanium, .15 to .35 percent magnesium, .20 to .35 percent carbon, balance nickel, mounting said element in a tube, and submitting the assembled tube to a temperature equal to its critical temperature during evacuation whereby the element is hardened.

7. The process of making a vacuum tube which comprises forming an electrode element of a precipitation hardening alloy consisting of substantially .25 percent titanium, substantially .25 percent magnesium, substantially .30 percent carbon, balance nickel, mounting said element in a tube, and submitting the assembled tube to a temperature equal to its critical temperature during evacuation whereby the element is hardened.

FRANCIS E. BASH.